(12) United States Patent
Pacios Rivera

(10) Patent No.: US 11,059,210 B2
(45) Date of Patent: Jul. 13, 2021

(54) PLASTIC INJECTION MOLDING MACHINE AND MOLDING METHOD

(71) Applicant: DISEÑO Y DESARROLLO DE MATRICERIA, S.L., Cabañas Raras (ES)

(72) Inventor: Jose Antonio Pacios Rivera, Cortiguera (ES)

(73) Assignee: DISEÑO Y DESARROLLO DE MATRICERIA, S.L., Cabañas Raras (ES)

(*) Notice: Subject to any disclaimer, the term of this patent is extended or adjusted under 35 U.S.C. 154(b) by 0 days.

(21) Appl. No.: 16/626,954

(22) PCT Filed: Jun. 28, 2017

(86) PCT No.: PCT/ES2017/070469
§ 371 (c)(1),
(2) Date: Dec. 27, 2019

(87) PCT Pub. No.: WO2019/002635
PCT Pub. Date: Jan. 3, 2019

(65) Prior Publication Data
US 2020/0139602 A1   May 7, 2020

(51) Int. Cl.
*B29C 45/68* (2006.01)
*B29C 45/32* (2006.01)
(Continued)

(52) U.S. Cl.
CPC ............ *B29C 45/32* (2013.01); *B29C 45/045* (2013.01); *B29C 45/1744* (2013.01);
(Continued)

(58) Field of Classification Search
CPC ... B29C 45/045; B29C 45/67; B29C 45/6707; B29C 45/6728; B29C 45/68;
(Continued)

(56) References Cited

U.S. PATENT DOCUMENTS 3,587,138 A * 6/1971 Bammert ............ B29C 45/6714
425/589
3,635,152 A    1/1972 Olmsted
(Continued)

FOREIGN PATENT DOCUMENTS

ES    8406291 A1    8/1984
ES    2162013 T3    12/2001
(Continued)

OTHER PUBLICATIONS

International Search Report of PCT/ES2017/070469 dated Dec. 15, 2017 [PCT/ISA/210].
(Continued)

*Primary Examiner* — James P Mackey
(74) *Attorney, Agent, or Firm* — Sughrue Mion, PLLC

(57) ABSTRACT

A plastic injection molding machine and molding method related to an injection molding machine for stack molds, wherein the central portion of the mold remains fixed and it has two molding faces that act on the fixed central portion by means of a hydraulic chamber that produces the clamping force and prevents the deformations due to bending on the molding faces. Likewise, it relates to a molding method.

8 Claims, 12 Drawing Sheets

(51) Int. Cl.
*B29C 45/04* (2006.01)
*B29C 45/17* (2006.01)
*B29C 45/50* (2006.01)
*B29C 45/67* (2006.01)
*B29C 45/66* (2006.01)

(52) U.S. Cl.
CPC ...... *B29C 45/1761* (2013.01); *B29C 45/5008* (2013.01); *B29C 45/68* (2013.01); *B29C 45/67* (2013.01); *B29C 45/6707* (2013.01); *B29C 45/683* (2013.01); *B29C 2045/1764* (2013.01); *B29C 2045/5028* (2013.01); *B29C 2045/665* (2013.01); *B29C 2045/675* (2013.01); *B29C 2045/688* (2013.01)

(58) Field of Classification Search
CPC .......... B29C 45/683; B29C 2045/1764; B29C 2045/1792; B29C 2045/665; B29C 2045/675; B29C 2045/688
See application file for complete search history.

(56) References Cited

U.S. PATENT DOCUMENTS

| | | | |
|---|---|---|---|
| 4,207,051 A | 6/1980 | Wright et al. | |
| 5,091,124 A * | 2/1992 | Zakich | B29C 33/202 264/328.6 |
| 5,620,723 A | 4/1997 | Glaesener et al. | |
| 5,714,180 A * | 2/1998 | Lampl | B29C 45/12 425/589 |
| 5,863,474 A * | 1/1999 | Ito | B29C 45/1751 264/328.1 |
| 6,027,329 A | 2/2000 | Nazarian et al. | |
| 6,439,876 B1 | 8/2002 | Glaesener | |
| 6,613,262 B1 * | 9/2003 | Arend | B22D 17/005 264/255 |
| 9,738,021 B2 * | 8/2017 | Yoda | B29C 45/1761 |
| 10,857,712 B2 * | 12/2020 | Buzzo Titella | B29C 45/32 |
| 2005/0053688 A1 | 3/2005 | Iwata et al. | |
| 2008/0175938 A1 | 7/2008 | Teng et al. | |

FOREIGN PATENT DOCUMENTS

| | | |
|---|---|---|
| FR | 1304803 A | 9/1962 |
| FR | 2294041 A1 | 7/1976 |
| FR | 2295832 A1 | 7/1976 |
| JP | 62-7521 A | 1/1987 |
| JP | 09-300415 A | 11/1997 |
| WO | 97/48540 A1 | 12/1997 |
| WO | 02/22340 A1 | 3/2002 |
| WO | 03/084731 A1 | 10/2003 |

OTHER PUBLICATIONS

Written Opinion of PCT/ES2017/070469 dated Dec. 15, 2017 [PCT/ISA/237].

* cited by examiner

A - A

D - D

E - E

PLASTIC INJECTION MOLDING MACHINE AND MOLDING METHOD

CROSS REFERENCE TO RELATED APPLICATIONS

This application is a National Stage of International Application No. PCT/ES2017/070469, filed Jun. 28, 2017.

APPLICATION FIELD OF THE INVENTION

The present invention relates to a machine for manufacturing plastic pieces for the injection molding method that improves the systems that use injection molding machines for the use thereof with simple or stack molds, as well as the molding method. More specifically, the machine object of the invention is of special application in the manufacturing of large series of pieces for the packaging, food, health etc. sectors, using multi-cavity molds, as well as in smaller series of pairs of pieces, the shape of which is approximately symmetrical, such as, for example, front and back bumpers, or left and right door panels, for the automobile sector, among others.

The invention falls within the field of machinery for injection molding of plastic components.

DESCRIPTION OF THE STATE OF THE ART

Generally, plastic injection molding machines have a stationary platen and a mobile platen, upon which each of the two halves that make up the mold are fastened, and a rear platen, whose structural function is to withstand the necessary forces to keep the mold closed during the molding process. They are voluminous machines that require considerable space for the placement thereof, and with elevated masses that must be put into motion when opening and closing the molds, which negatively affects the cycle time. The size of the mold conditions the size of the machine and the necessary clamping force, which is proportional to the injection surface. The greater the clamping force and the size of the platen, the more the deformations due to bending stress of these can increase and, as a result, the appearance of flash in the resulting pieces of a defective mold closing.

Especially useful for multi-cavity molds for small pieces are the stack-type molds, which enable the surface of the mold projected on the machine plates to be reduced, since they have two molding faces, which enables the productive capacity to be multiplied or the size of the mold to be reduced without needing to increase the clamping force. In summary, the stack mold is made up of two side portions and a central portion that has two molding faces, each facing each of the side portions.

In the state of the art there are numerous documents that describe machines or executions for stack molds in which a side of the mold is joined to the stationary platen while the other side is joined to a mobile platen, and the central portion accompanies the movement of the mobile platen through a mechanism of a certain complexity. In this case, it is necessary for the total opening stroke to be double the individual opening stroke of each molding surface and negatively affects the opening time twofold, when comparing it to as it would be if the openings were made independent, for example by maintaining the central portion stationary and moving each of the sides.

Furthermore, the insertion of the molten polymer is generally done through the stationary platen, which causes great complexity when designing the supply of the mold, it being difficult to guarantee the same conditions of the material in the different portions of the mold and the molding surface being reduced and consequently reducing the numbers of figures. Document U.S. Pat. No. 4,207,051 shows a type of construction in which the injection is carried out in the central portion, but requires the use of complex, expensive telescopic systems, or the withdrawal of the injection system each time the mold is opened.

Moreover, the pieces cannot be extracted until the mold opening movement has been completed. Given that in order to carry out the opening of the mold, the mobile platen and the central portion are moved in the same direction and simultaneously; if the pieces made in the molding chamber that are between the side portion attached to the mobile plate and the central portion are taken out before completing the opening movement, the central portion will collide with the molded pieces. It would be very advantageous to carry out the extraction of the molded pieces at the same time that the opening movement is started since it would reduce the cycle time. Furthermore, the piece extraction is interrupted by the feed channel of the central portion, which would make the pieces collide with it.

The following documents ES8406291, FR1304803, FR2294041 WO9748540 and JPS627521 refer to injection machines for stack molds, the central portions of which stay fixed. All of these have either two rear platen with two mobile platen, in which case it relates to voluminous installations, or a single rear mobile platen with two mobile platen, in which case the mobile mass is increased, and furthermore also the time of the closing operation generally due to the fact that the closing strokes of the two mobile plates cannot be carried out simultaneously. Furthermore, in this last case it always increases the length of the machine when the closing is produced due to the movement of the mobile rear platen.

Document FR2295832 does not have rear platens for applying the clamping force. Once the end plates are brought together, the tie bars are blocked with clamps and the force is applied through hydraulic cylinders located in the executions 1 and 3 in the own tie bars or in the central stationary platen. In any of the embodiments, the tie bars are joined to one of the two mobile platens and therefore these swell the amount of mobile mass, increasing either the operation time and/or the energy consumption, in addition to the fact that the length of the machine is increased by the movement of the tie bar itself.

In all the previously cited cases, an additional problem is presented. It is well known that upon applying the clamping force a significant deformation is produced due to bending stress of the mobile plates and especially the stationary one. This causes the portions of the mold to not close perfectly together, giving rise to the formation of flash and defective pieces. Generally, the bigger the mold is, the more distance could be required between tie bars and a greater clamping force that would create much larger deformations, for which reason much thicker plates are required and therefore greater mobile masses.

One of the ways of eliminating the deformation due to bending stress is as was described in part of the documents in which the central portion stays stationary, where due to applying the clamping force on the sides, the reactions are balanced and thus the deformation due to bending stress in this plate is eliminated. However, the deformation due to bending stress continues to appear in the mobile platens.

Documents ES2162013, WO03/084731, U.S. Pat. Nos. 6,027,329, 6,439,876 and US2008/0175938 describe a series of mold-holding plates with diverse geometries that are more or less complex, the object of which is to eliminate the flexure deformations on the face of the platen joined to the mold and therefore the molding surface kept flat. One of the disadvantages of this solution is that it requires a large mobile platen thickness in order for the geometry to work effectively. Furthermore, a single geometry is not valid for the application of any clamping force, for which reason it is necessary to define a series of application ranges for each geometry.

Within the stack molds, they are especially advantageous for use in the production of pieces that require the use of two different materials the cube molds. These are generally stack-type molds, like those described previously, in which the central portion, in addition to moving linearly, has the possibility of rotating. Upon being able to rotate, they can have several molding faces, generally four, although it is not limited to this number, using two simultaneously in the injection process. In one of the portions of the mold, the piece is injected with one type of material and in the other portion the second type of material is deposited on a piece that is inside an opposite face and that was molded previously in the other portion. No more details of the operation will be needed since it implies more than enough for those persons related to this type of art. The central portion does not only have rotation movement, it also has a very high mass that has to be moved linearly to be able to carry out the opening and closing, and this creates a large mass that must be put into motion, which negatively affects the cycle time and the energy consumption. Furthermore, it requires having to complete the injection through the end plates, one of the units being placed in the mobile plate, which increases the mass to be moved even more.

None of the cited documents relate to a system where the impact of the bending deflection is reduced by the system itself applying the clamping force. A system of this type, such as the object of the present invention, enables the use of lightweight plates and reduced dimensions, which further favor the cycle times and reduce the dimensions of the machine. All of this considering stack-type molds, in which the mold itself can be integrated inside the machine, with a fixed central portion, which as such is the stationary portion of the mold, that which receives the feeding, and with minimal dimensions, wherein components are reduced, such as the rear platens for example, being only the two mobile end plates being in motion and with reduced dimensions.

DESCRIPTION OF THE INVENTION

One of the main objectives of the present invention is that of producing the greatest number of pieces possible in the shortest time, and to do so, a machine configuration is used based on stack molds in which a central platen is arranged, which is stationary, and which has two molding faces that are opposite and on both sides of the stationary central platen. Thus, apart from increasing the production, the energy consumption is reduced, for which reason the productivity is increased. Therefore, a first object of the invention is a machine according to claim 1. A second object of the invention is a molding method carried out by the machine object of the present invention according to claim 8.

The machine of the present invention therefore comprises a stationary central plate with at least two molding faces on at least two opposite sides of said central plate, and it is connected to an injection unit that provides the molding material to the machine that interacts with two mobile platens, located on each side of the stationary central platen and movable on a same linear axis in order to face the molding faces of the stationary central platen. Each mobile platen further comprises a locking system that prevents the linear movement of the mobile platens while the clamping force is applied, a pressure plate facing the molding face of the stationary central platen, at least one mobile plate, at least one hydraulic chamber, located between the mobile plate and the pressure plate, connected to a hydraulic system through a duct for the insertion and evacuation of a fluid in said chamber, and a movement system of said mobile platens. The different portions of the mold can either join to the central platen and the pressure plates in each mobile platen, or be integrated into these portions.

The fact that the central plate is stationary means that it is not movable in the same movement axis as the mobile platens, however, if it can be mobile with respect to an axis that is perpendicular to said linear movement axis of the mobile platens, in particular, rotating with respect to said axis that is perpendicular to the one for the movement of the mobile platens. In this way there could be more than two molding faces in the central plate of the machine, being a cube mold configuration.

Due to the fact that the stationary central platen is fixed and the mobile platens can move with a single linear simultaneous opening and closing movement in both platens, the clamping forces created are equal on both sides of the stationary central platen, in this way upon forming an assembly or packet and the central plate being compressed the same amount on both sides, no bending will be produced in the portion of the mold attached to the stationary central plate. Until the clamping forces are applied, the mobile platens are moved by means of a movement system.

The supply of the molding material is carried out on one side of the machine with the injection and plasticization unit rigidly joined to the stationary central platen. Thus, the use of hydraulic cylinders or other mobile fastening systems which are generally used in the machines of the state of the art is avoided. This injection and plasticization unit can be arranged in any orientation, preferably with the injection axis horizontal and perpendicular to the movement axis of the mobile platens, or horizontal and parallel to said axis, even being installed vertically.

In order to carry out the closing of the mold, the movement system first causes the mobile platens to move by means of electric or hydraulic actuators. For the movement to be carried out at the highest speed possible, it is very important that the mobile masses be minimal. As was mentioned previously, in the present invention the mobile masses are limited to mobile platens.

After closing the mold, the mobile plates are blocked, by means of the locking system. Said locking is preferably carried out against locking tie bars, parallel to the movement axis of the mobile platens. Thus, the tie bars do not allow for the mobile platens to be moved during the application of the clamping force and in this way making the clamping force effective between the molding faces.

In order to carry out the clamping force, it has a hydraulic chamber with fluid between the mobile plate and the pressure plate, such that upon inserting the fluid with a controlled pressure in said chamber, each mobile platen tries to stretch the aforementioned locking tie bars while each pressure plate actuates against the molding faces of the stationary central platen. The face of the pressure plate in contact with the fluid needs to have similar dimensions as the molding face. Thus, the deformation obtained in the mobile plate does not matter, since due to the equality of pressure exerted on the pressure plate, a uniform force is created actuating on said pressure plate and no flexure deformation is produced. Therefore, bending deformations are not be produced neither in the pressure plate due to the hydraulic chamber nor in the stationary central platen due to the compression produced by both pressure plates, therefore the quality of the pieces obtained is increased, eliminating or reducing the occurrence of flash, which causes the piece to be rejected.

The invention enables the elimination of the rear platen, achieving a reduction in the length of the machine and without negatively affecting the mobile masses or reducing the quality of the pieces due to the effects of the deformations of the plates.

With this machine configuration, the cores or the cavities can be situated indistinctly in the portions of the mold placed in the stationary central platen or in the mobile platens.

Preferably, the mobile platens, actuated by the movement system are moved along guides that are abutting on a chassis. The stationary central plate is also fixed on this chassis. The extraction of the pieces is preferably carried out from the lower portion of the mold. The machine of the present invention enables the manufacturing in only one injection shoot of at least two pieces of any size, changing the dimensions of the machine, one on each side of the stationary central platen.

In the specific case of large pieces, the configuration of the machine is further simplified, since the chassis is not necessary, but rather the guide rails upon which the mobile plates slide directly abuts on guides in the floor. In this case, and due to the fact that it is not possible to perform the extraction of the pieces from the lower portion, a robotic or manual piece extraction system can be installed on the upper face of the stationary central platen for an upwards vertical extraction of the pieces. Another possible alternative is the installation of a robotic piece extraction system that carries out a side extraction of the same. In any of the cases, this would be an extraordinarily advantageous configuration for the manufacturing of large-sized pieces.

For greater clarity, the molding method according to the present invention will be explained below. The phases followed by the machine will start from the open mold position as the beginning of the cycle. First, a movement of the mobile platens will be produced, activated by a movement system, such that the pressure plate contained in each of these comes into contact with each of the molding faces included in the stationary central platen. Each plate is moved in the opposite direction simultaneously. Once this position has been reached the blocking of the mobile plate is then performed by means of the locking or blocking system, which retains the movement of the mobile plate in the moment that the clamping force is applied. Then, a fluid is inserted into the hydraulic chamber with a double objective, on one hand that of applying the necessary clamping force so that the mold does not open during the injection, and on the other hand that of maintaining the pressure plate free of flexural deformations. Once the clamping force has been established, the mold is then filled with plastic coming from the injection unit. Once this step is completed, the pieces molded in the mold are then cooled, and then the fluid contained in the hydraulic chamber is drained. Afterwards, the mobile plates of the locking systems must be unblocked, in other words, proceed to unlock the mobile plates of the tie bars, such that it allows the translation of these in the opening and closing direction. The last phase consists of the movement of the mobile platens, moving away from the stationary central platen. This last phase is preferably used to proceed to the expulsion of the pieces from the mold.

Other details of the machine of the present invention, such as other particularities, variations in the components thereof, other objectives and advantages of the same, are explained in the detailed description below and in the attached figures.

DESCRIPTION OF THE DRAWINGS

Below figures are described that contribute to a greater understanding of the invention and that are expressly related to the embodiments of the invention, showing examples that are illustrative and non-limiting.

FIG. 11b shows a cross-sectional view of the fifth embodiment with the system of the movement of the mobile platen and the locking system shown in FIG. 11a.

DESCRIPTION OF PREFERRED EMBODIMENTS

In order to achieve a better understanding of the invention, several forms of embodiment of the present invention will be described below based on the presented figures.

Figure 1:
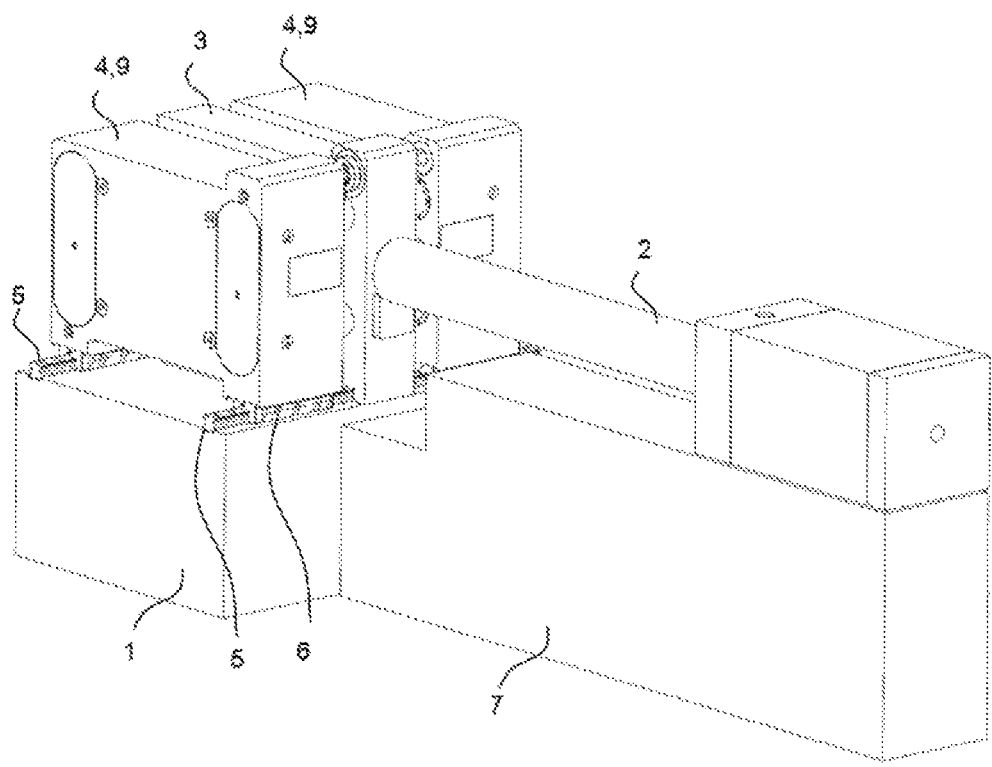
FIG. 1 shows a perspective view of a first embodiment of the injection machine object of the present invention in a closed mold position.

FIG. 1 shows a general view of the machine in the first embodiment thereof, in which it is shown in a closed mold position. The chassis (1) abuts on the floor, acts as support and positioning of a large portion of the elements that make up the machine. In addition, this chassis (1) could house in the inside thereof other additional elements which could be, for example, injected piece collection systems, coolers or other devices. The stationary central platen (3) is placed on the chassis (1), joined to the frame (1) by means of mechanical means. The stationary central plate (3) has two molding faces in this embodiment, located on opposite sides. Another molding face contained in the mobile platen (4) is closed on each molding face of the central platen. The molding faces of the stationary central plate (3) and the molding faces of the mobile platen (4) make up the mold. The mobile platens (4) are moved linearly on the guide rails (5) and the guide blocks (6) thereof such that an opening and closing of the mold is produced.

In order to insert the plastic into the mold a plasticization and injection unit (2) is used that in the preferred embodiment thereof is as shown in FIG. 1, and that corresponds with the injection axis thereof perpendicular to the opening and closing movement of the mobile platens (4). The outlet duct of the material of the injection and plasticization unit (2) is rigidly connected to the inlet hole of material of the stationary central plate (3), which is located on one of the outer side faces. This connection is maintained during all of the operations of the machine object of the present invention, for which reason the forward and backward movements of the injection and plasticization unit (2) which are common in existing injection machines are not necessary. Thus, the means for carrying out these movements (generally hydraulic cylinders or an electric motor and screws) are removed, greatly simplifying the design of the injection and plasticization unit (2) and reducing the maintenance to be done. In order to support the injection and plasticization unit (2) it has a frame-tank (7), this frame could also be used as an oil reservoir.

Figure 2:
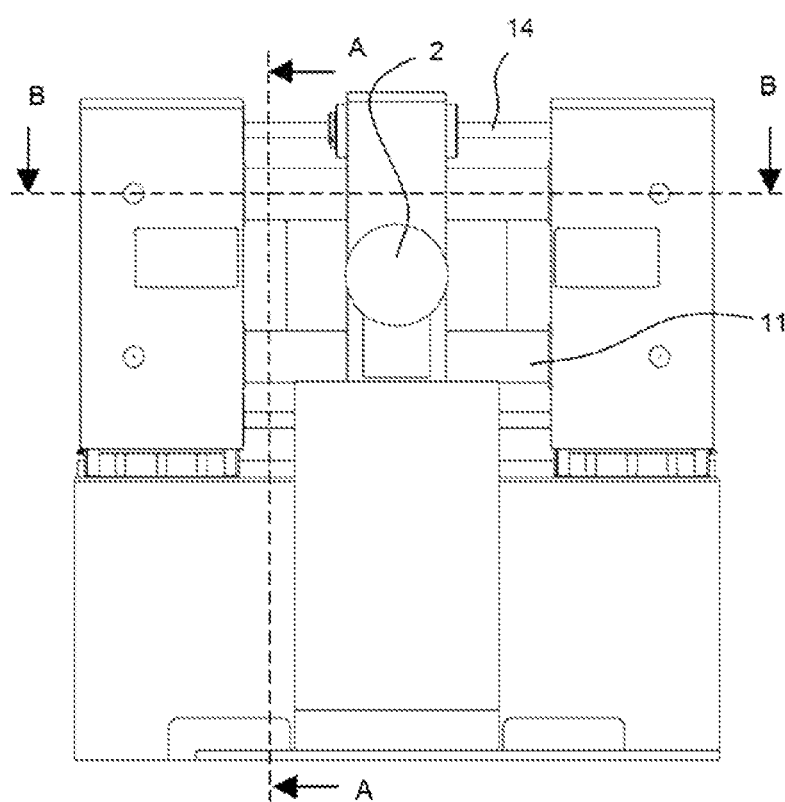
FIG. 2 shows a side view of the injection machine object of the present invention in an open mold position. The injection unit is partially shown for more clarity.
Figure 3:
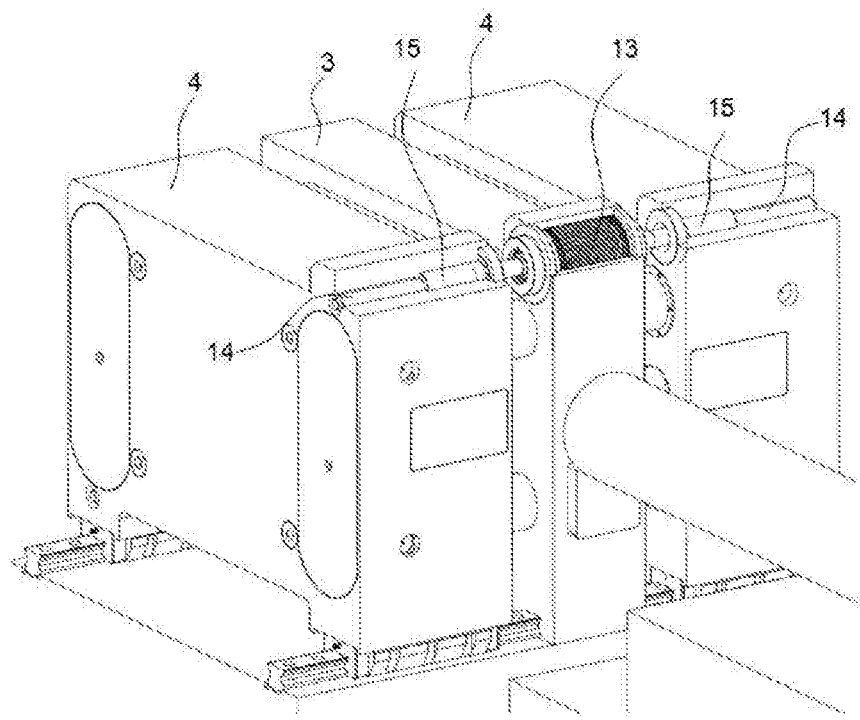
FIG. 3 shows a perspective view with a detail of a partial cross section of the actuation of a first movement system for the embodiment of the opening and closing movement of the mobile platens.

FIG. 2 corresponds to the same view of the preferred embodiment but in an open mold position. The opening and closing of the molds is carried out through linear movement, parallel to the molding faces, of the mobile platens (4), that slide on the guide rails (5) by the guide blocks (6) joined to the bottom of the mobile plate (9). In FIG. 3 a preferred schematic embodiment is shown of a first example of an actuation system for producing the movement of the mobile platens (4), which comprises two electric motors (13) located in the sides of the stationary central platen (3) although it could include more. Each electric motor (13) is mechanically coupled with a screw (14) which rotates integrally with the rotor of the motor. On one of the ends of the screw (14) there is a surface with a right-hand thread and on the opposite end there is a symmetrical surface with a left-hand thread, in other words, the screws (14) are manufactured with opposite directions at each end, such that the nuts (15) that couple on the threaded surfaces advance linearly in opposite directions when the screw (14) completes the rotation movement thereof. This actuation configuration enables a simultaneous and symmetrical linear movement of the mobile platens (4) to be obtained. This is in comparison with stack molds without a fixed central portion that reduces the opening time to approximately half, since in this case the opening stroke is completed simultaneously between the two sides.

Figure 4:
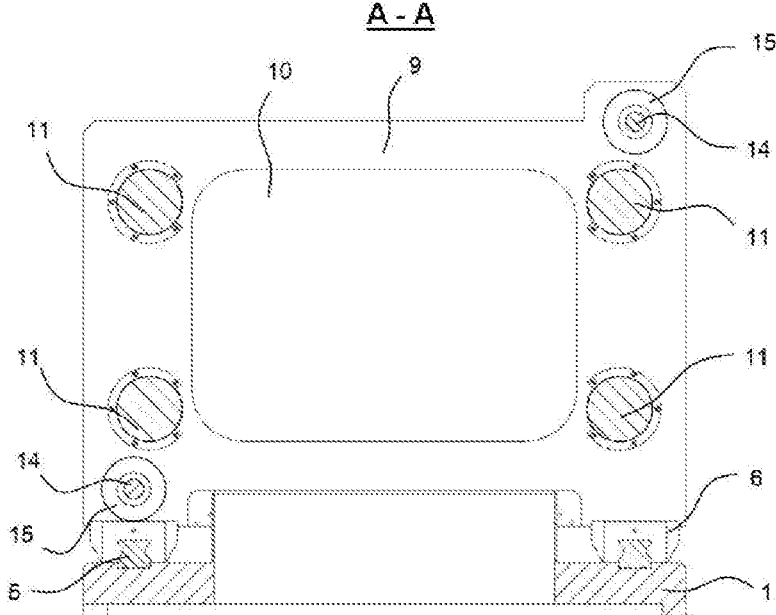
FIG. 4 shows an elevation view of a cross section A-A, according to FIG. 2, in which the face of the mobile platen is seen from the stationary central platen.

FIG. 4 shows a cross section in which the face of a mobile platen (4) is seen from the stationary central plate in order to show the position of the screws (14) referring to the mobile platen (4), according to the preferred embodiment. The position thereof is such that the center of mass of the mobile platen (4) is situated between the two motors in order to prevent overturning torque. A preferred situation of the locking tie bars (11) is also shown according to a first example of a locking system.

Once the closing movement has been completed, the molding faces of the mobile platens (4) are in contact with the molding faces in the stationary central platen (3), almost without force, creating the molding shape between them. In order to produce the molded piece the mold is filled with molten plastic at high pressure, which attempts to separate the two portions of the mold. In order to maintain both portions joined and prevent the material from escaping, a sufficiently large clamping force is applied that is able to maintain the molding faces joined.

Figure 5:
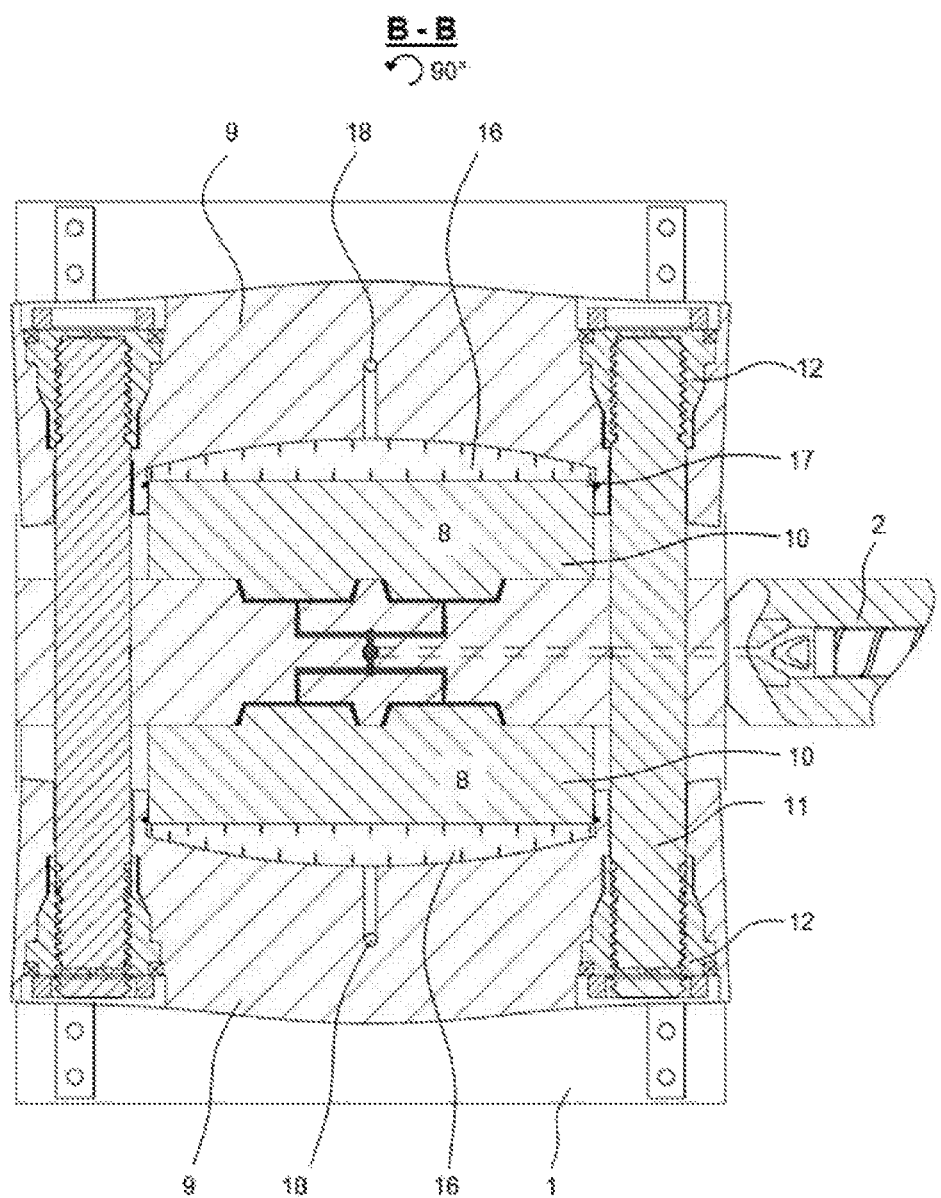
FIG. 5 shows a schematic cross section that shows the elements that are involved in the closing of the mold, according to the cross section B-B turned 90° indicated in FIG. 2. Some elements have been drawn with an intentionally large deformation in order to create a clearer description of the system.

FIG. 5 shows a schematic cross section in order to represent the elements that intervene in the closing of the mold. Some elements have been drawn with an intentionally large deformation in order to carry out a description of the system with greater clarity. The stationary central platen (3) contains a distributor on the inside that leads the molten plastic to the two molding faces (8) coming from the injection and plasticization unit (2). The mobile platen (4) is mainly made up of two portions, the mobile plate (9) and the pressure plate (10). The portions that make up the mold can be joined to the stationary central platen (3) and to the pressure plate (10), or they can simply be integrated in these portions, furthermore, the cavities and cores can be indistinctly placed in the fixed portion of the mold or in the mobile portion according to convenience of manufacturing. FIG. 5 shows the plate of cavities in the stationary central portion of the mold. Between these two portions, the mobile plate (9) and the pressure plate (10), there is a hydraulic chamber (16), such that in order to carry out the clamping force a fluid is inserted into said chamber (16) at a controlled pressure. In order to avoid leakage of the fluid in the hydraulic chamber (16) it has sealing gaskets (17). This fluid causes a force on the pressure plate (10) that makes it close against the stationary central platen (3). Upon receiving the same force by both opposite molding faces (8), only deformations due to compression will be created, there not being deformations due to bending. Moreover, the pressure plate (10) receives the force in a uniformly distributed manner, since the pressure in the hydraulic chamber (16) is constant throughout it. Since the surface in contact with the hydraulic fluid is similar to the closing surface, flexural deformations are not produced either, regardless of the deformation that can take place in the mobile plate (9). Thus, the pressure plates (10) and the stationary central platen (3) act like a packet of pieces working under compression, with which the closing is perfect and the obtained pieces are high quality, both in elimination of flash, thicknesses completely in accordance with the requirements and consequently uniform piece weight.

The pressure plate (10) can have any shape, needing to have a geometry as similar as possible between the portion that is inside the mobile plate (9) and the total closing surface. The fluid inlet in the hydraulic chamber is carried out through at least one hydraulic inlet duct (18), coming from a hydraulic system with conventional elements which could be a pump, valves, servo valves, etc. . . . , that enable controlled flow and pressure conditions to be established.

Figure 6:
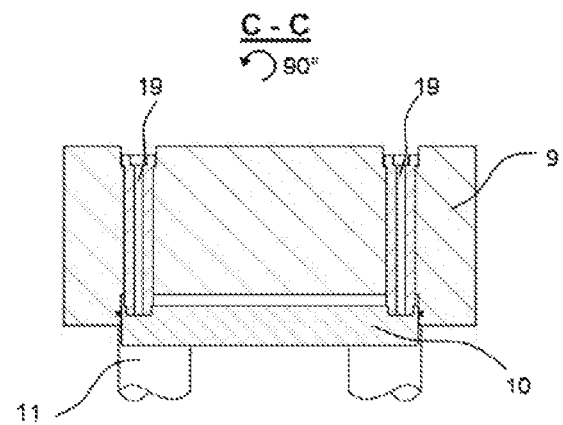
FIG. 6 shows a transverse cross section of the mobile plate and the pressure plate through the area of the stop rods according to the cross section C-C indicated in FIG. 7.

Stops are placed in the pressure plate (10) in order to prevent it from coming out of the mobile plate (9). In FIG. 6, stop rods (19) are shown that are joined to the pressure plate (10) and that slide along the inside of the mobile plate (9) and that at the end of the stroke abut against it. These stop rods could also act, if desired, as guides of the pressure plate and of refrigeration ducts for the pressure plate (10).

The fluid contained in the hydraulic chamber (16) also exerts a force on the mobile plate (9). To retain them, it has a locking system, which in a simplified manner is made up of locking bushings (12) and locking tie bars (11). In a first example of a locking system as seen in FIG. 5, there are 4 locking tie bars and 8 locking bushings, half of which are placed in each mobile platen. The locking tie bars (11) are placed in the stationary central platen (3) and have teeth on the ends. These teeth are complementary and are facing each other with others made in the locking bushings (12) that are concentric to the locking tie bars (11), such that the bushing cannot carry out any movements. The locking bushing (12) is integrated inside the mobile platen (4), and any movement of the mobile plate is hindered by the blocking carried out between the bushing and the locking tie bar (11). Thus, the force generated in the hydraulic chamber (16) is transmitted to the locking tie bars, which will be working in tensile, and these will retain the movement of the mobile plate (9). FIG. 5 shows a deformation due to bending stress in the mobile plate, however, this deformation will not have any damaging effect on the closing surface of the mold, due to the causes explained above.

In the preferred embodiment, the locking bushings (12) can carry out a rotation movement around the longitudinal axis of the corresponding locking tie bar (11). The toothing created both in the locking bushing (12) and in the locking tie bar (11) is not tangentially continuous, but rather it is presented in angular sectors such that there are as many angular gap sectors as there are angular teeth sectors, and furthermore they have the same angular value. In the blocked position the teeth of both portions, locking bushing (12) and locking tie bar (11) are facing each other. In the unblocked position, the gap in a portion is facing the teeth of the other one, thus enabling the mobile platen (4) to be moved longitudinally along the tie bar. In order to alternate between the two positions a rotation of the locking bushings (12) is needed.

Figure 7:
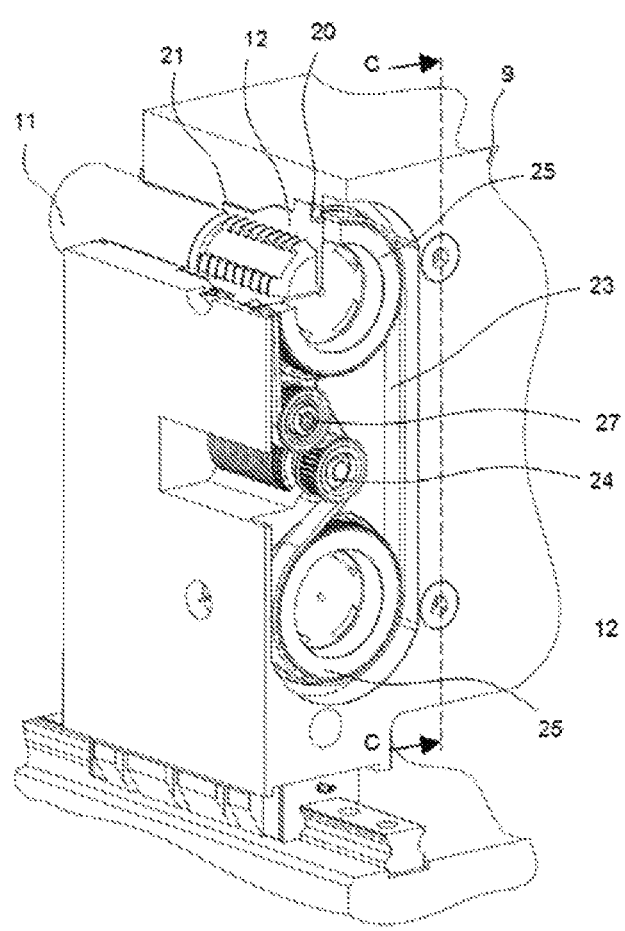
FIG. 7 shows a detail in perspective of a first example of a locking system.

FIG. 7 shows the preferred embodiment of the actuation system of the first example of the locking system, in which in order to move the two locking bushings (12) an electric motor (22) is used, which is coupled with these through a belt (23) and a driver pulley (24) installed at the outlet of the motor, and two driven pulleys (25) joined to the locking bushings. A tensioning pulley (27) enables the correct tension to be applied to the belt (23). Furthermore, it has a ball bearing (20) and a sliding bushing (21) for the support of the locking bushing (12), in each nut housed in the mobile plate (9). This system is repeated in each mobile platen for each pair of locking tie bars (11). The locking system alternates between the blocked and released position. In order to reach each position, the electric motors (22) intermittently rotate, always in the same direction. The fact that the rotation is carried out in the same direction makes the wear caused uniform, and increases the life of the components compared to other mechanisms that have a movement that alternates between two positions. In order to detect whether the position of the bushing is correct, a position detector sensor (26) may be included.

Additionally, the machine object of the present invention comprises an electronic control system for automatically carrying out the process and an interface with the operator for the insertion and visualization of data (not shown in the figures).

Figure 8:
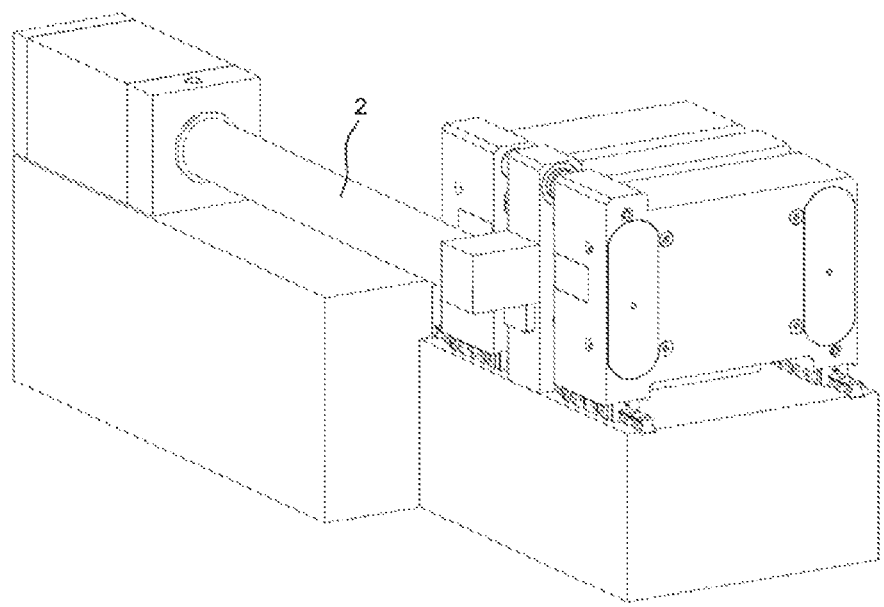
FIG. 8 shows a second embodiment of the invention according to a general view of the injection machine object of the present invention in a closed mold position and with the injection and plasticization unit with the axis parallel to the opening and closing direction of the molds.

FIG. 8 shows a second embodiment of the invention, wherein the injection and plasticization unit (2) is installed with the axis thereof parallel to the opening and closing direction of the mobile platens (4).

Figure 9:
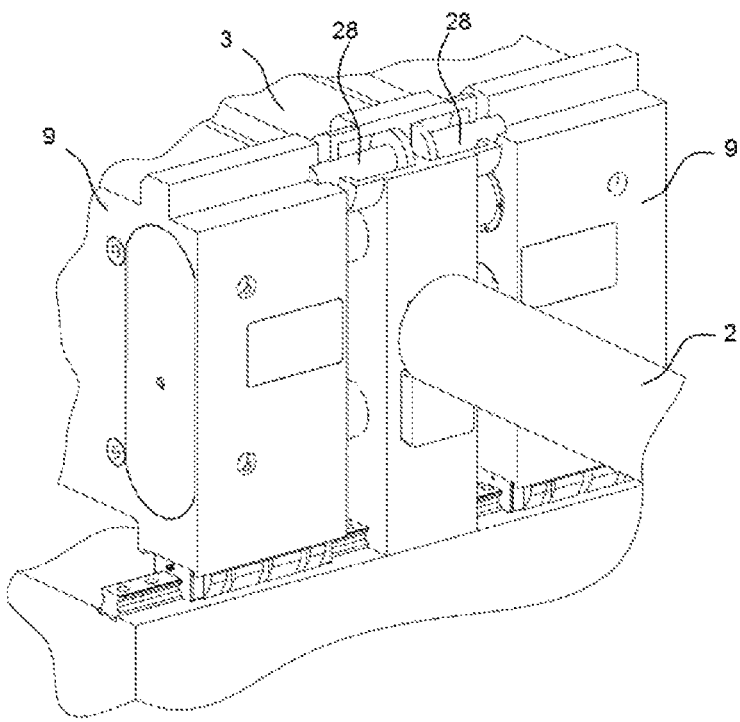
FIG. 9 shows a detail of a perspective view of a third embodiment of the invention with the actuation of a second example of a movement system for carrying out the opening and closing movement of the plates.

FIG. 9 shows a third embodiment of the invention wherein the motors (13), screws (14) and nuts (15) of the movement system, which are responsible for carrying out the linear opening and closing movement of the platens (4), are substituted by hydraulic actuators (28), thus showing a second example of a movement system. The rod of the actuator is joined to the mobile plate (9). Depending on the direction of movement, one chamber of the cylinder or another will be filled with a fluid from a hydraulic system under controlled flow and pressure conditions.

Figure 10A:
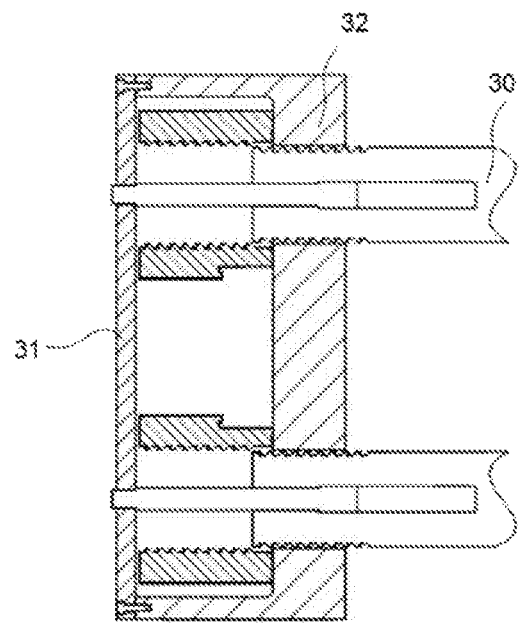
FIG. 10a shows a cross section view of a fourth embodiment of the invention with the actuations for the movement of the mobile platen according to a third example of a movement system with the mobile plate in open mold position. The cross section, similar to the cross section D from FIG. 11b tries to show the location of the actuations in the locking tie bars.
Figure 10B:
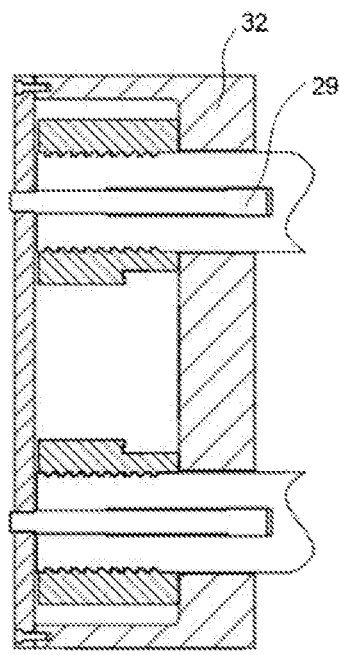
FIG. 10b shows a cross section view similar to FIG. 10a of the fourth embodiment of the invention with the actuations for the movement of the mobile platen in closed mold position.

A fourth embodiment of the invention has a third example of a movement system in order to carry out the opening and closing movement of the mobile platens (4). FIGS. 10a and 10b show this embodiment, wherein in this case the mold movement of the plates is carried out through hydraulic linear actuators (29) placed at the ends of the locking tie bars (30), the casing of the cylinder being carried out in the same tie bar. The rod of the actuator is joined to a lid (31) and is in turn joined to the mobile plate (32). Upon inserting a fluid through one side or the other of the rod, the movement of the same is caused in one direction or the other and in turn that of the mobile plate (32) in order to carry out the closing and opening movements of the mold.

Figure 11A:
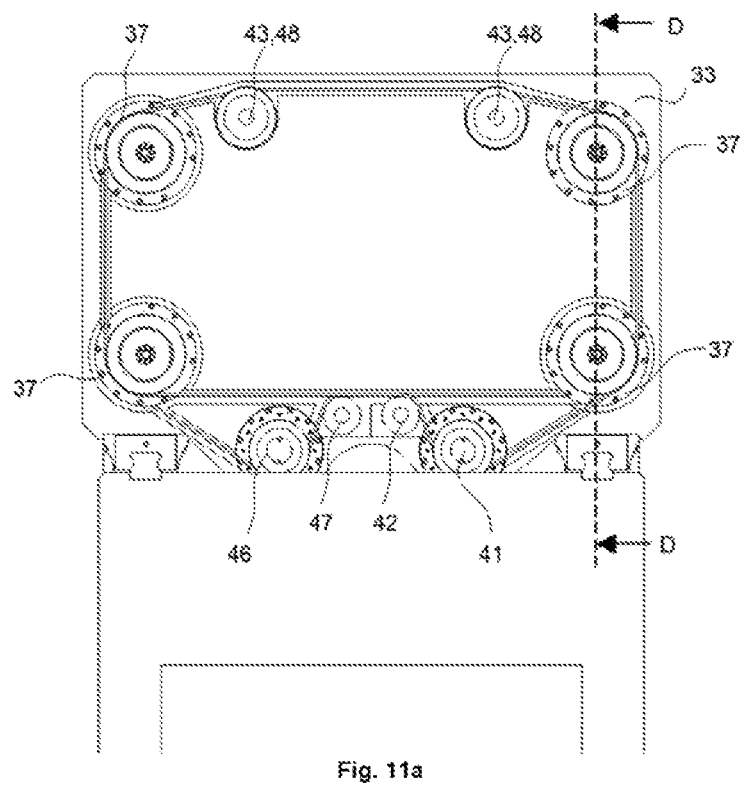
FIG. 11a shows a rear view of a fifth embodiment of the invention with the actuations according to a fourth example of a movement system for the movement of the mobile platen and a second example of a locking system with the tie bars.
Figure 11B:
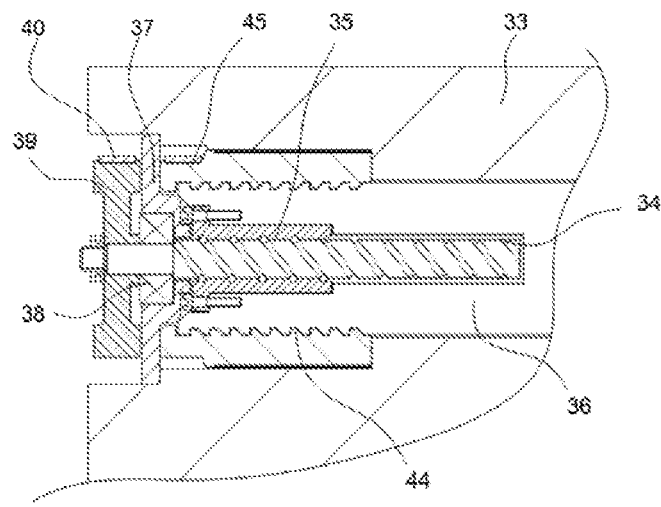

FIGS. 11a and 11b show a fifth embodiment of the invention that includes an advantageous configuration of a fourth example of a movement system for the actuation of the opening and closing movements of the mobile plates (33). In order to carry out this variant of the opening system, there is a screw (34) and nut (35) system installed at each end of the locking tie bar (36). The nut (35) is joined to the locking tie bar (36), both remaining static. A flange (37), containing an installed ball bearing (38) that serves as a support to the screw (34), is joined to the mobile plate (33) at each position of the locking tie bar. The screw (34) has, fixed to the outer end thereof, a pulley (39), which produces a rotation movement due to the coupling with a belt (40), in order to thus achieve the opening and closing movements of the mobile plates in this fourth example of the movement system. Depending on the direction of rotation, the screw (34) will move in one direction or the other, causing a pushing on the mobile plate (33) through the flange (37), and thus carrying out the opening or closing movement. The belt (40) is actuated by a motor and pulley assembly (41) installed in the mobile plate (33). It also has a tensioning pulley (42) and recovery pulleys (43) for actuating the opening and closing systems of the mobile plates.

The same figures also show a second example of a locking system. This locking system is like in the main embodiment, through alternate teeth with gaps in angular portions. In this embodiment, the locking bushings (44) of each mobile plate (33) move by means of a single belt (45) that is actuated by a single motor and pulley assembly (46) installed in the mobile plate (33). A tensioning pulley (47) and recovery pulleys (48) are also used.

Figure 12:
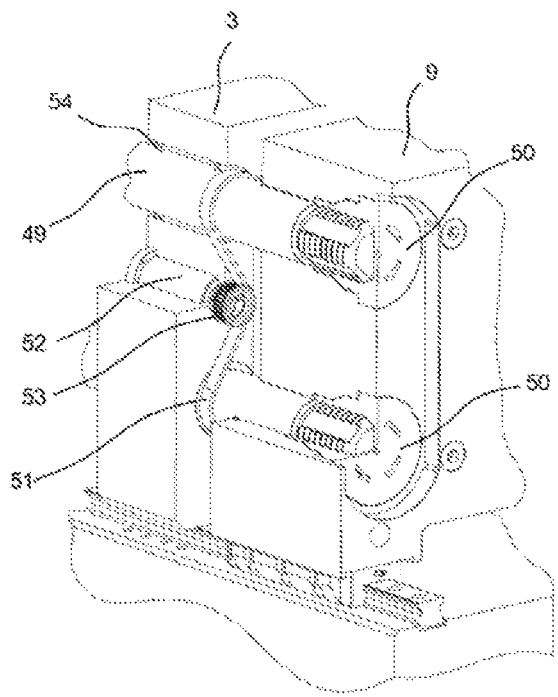
FIG. 12 shows a sixth embodiment of the invention with a detail of the actuation of a third example of a locking system.
Figure 13:
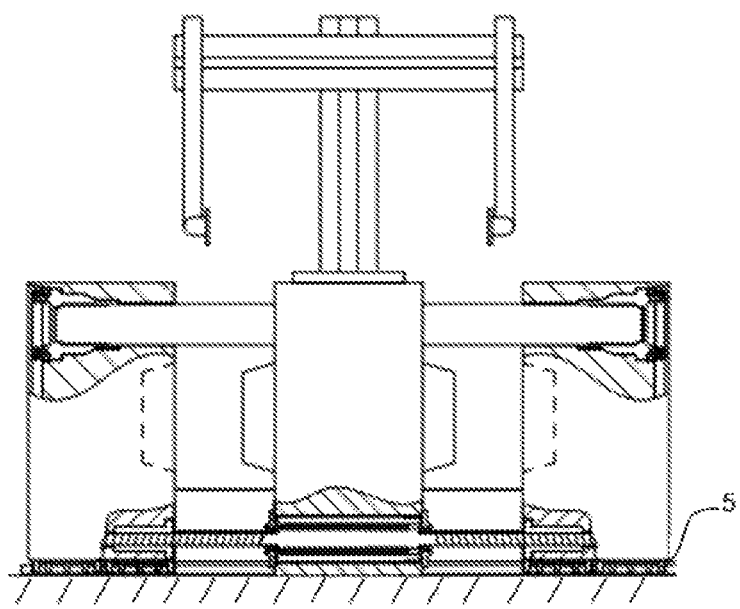
FIG. 13 shows a schematic view of a seventh embodiment of the invention with an installation for the production of large pieces.

FIG. 12 shows a sixth embodiment of the invention, wherein a third example is shown of a locking system with a locking principle that is similar to the one described in the main execution. However, in this case the locking bushing (50) is fixed and remains rigidly joined to the mobile plate (9), and is in the locking tie bar (49) itself where the rotation is produced, with the purpose of placing both elements with the teeth facing each other in order to perform the blocking or misalignments to make the linear movement possible. In order to perform the rotation thereof, the tie bars are supported on bearings (54) placed in the stationary central platen (3). To make the tie bars rotate, there is a motor (52) with a coupled pulley (53), which is responsible for actuating a flexible transmission element (51) that in turn is coupled to the locking tie bars (64). This motor could actuate two tie bars or four tie bars simultaneously.

FIG. 12 describes a seventh embodiment of the invention aimed at the manufacture of pieces that, due to the size thereof, make it practical to remove the chassis (1) in order to save installation space. In this case, the sliding guides (5) would be placed on the ground itself. The machine according to this embodiment of the invention mainly comprises all the elements listed in the preferred embodiment except the chassis (1). To extract the pieces, a robotic extraction system is used (55).

Figure 14A:
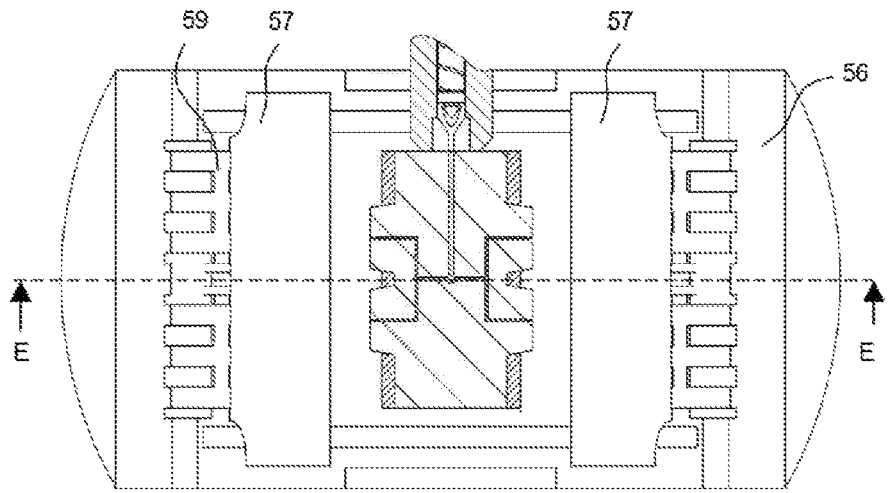
FIG. 14a shows an upper schematic view of an eighth embodiment of the injection machine object of the present invention in an open mold position with the central portion partially cross-sectioned, in which a movement and locking or blocking assembly system is shown.
Figure 14B:
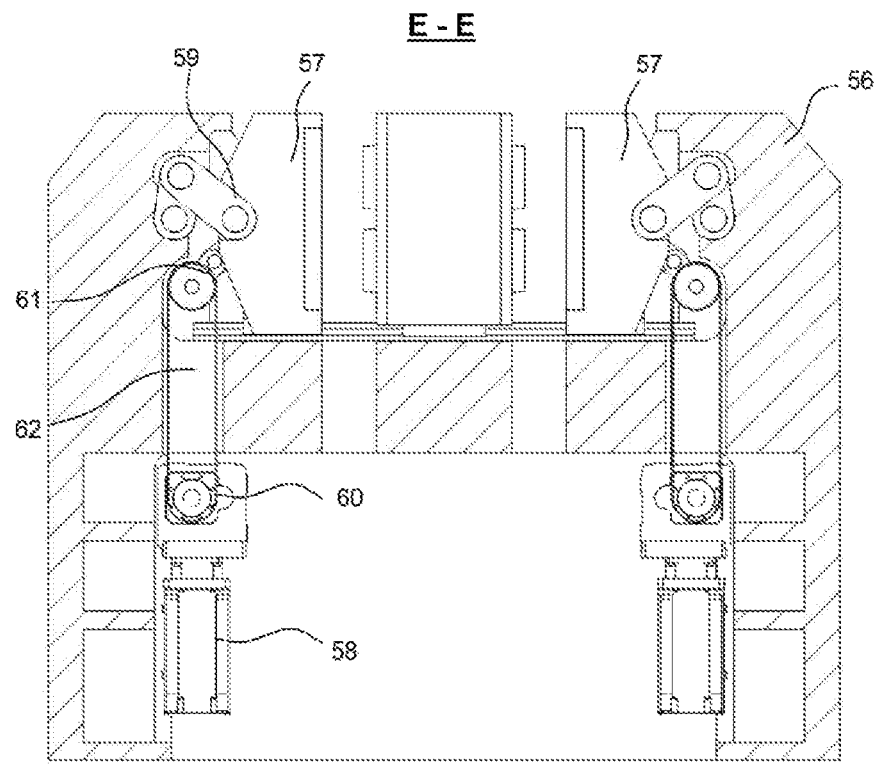
FIG. 14b shows a cross-sectional side view of the embodiment of the previous figure.

FIGS. 14a and 14b show an eighth embodiment of the invention that does not require locking tie bars (11) to transmit the clamping force, which enables an easy access to the open molding chambers as there are no locking tie bars. In this way, it is possible to extract the pieces through the side areas of the machine with a manipulator. It also enables in mold labelling systems to be used, which generally use a robot to access the open molding chambers where the paper or plastic labels are deposited before the molding operation. In this embodiment of the invention, the coupling of the mobile plates (57) and the fixed mold frame or chassis (56) must be capable of supporting the reaction generated when the clamping force is applied. To do so, there is a toggle linkage (59), the geometry of which is such that in the closed mold position, it reaches an irreversible blocking position and which is joined to the mobile plate (57) and the fixed mold frame (56). The operation of the toggle linkage (59) is known by a person skilled in the art and for this reason it shall not be explained in greater detail. In order to be able to actuate the mechanism, there is a geared motor (58), a driving pulley (60), a driven pulley (61) and a belt (62). As the geared motor (58) rotates in one direction or the other, it causes the toggle linkage (59) to move the mobile plate (57) in one direction or the other, and meaning that in the case of a closing movement, the mechanism is blocked, resulting in the mobile plate (57) remaining locked as the clamping force is carried out through the hydraulic chamber (16). Said toggle linkage (59) then serves in turn as a locking system.

Figure 15A:
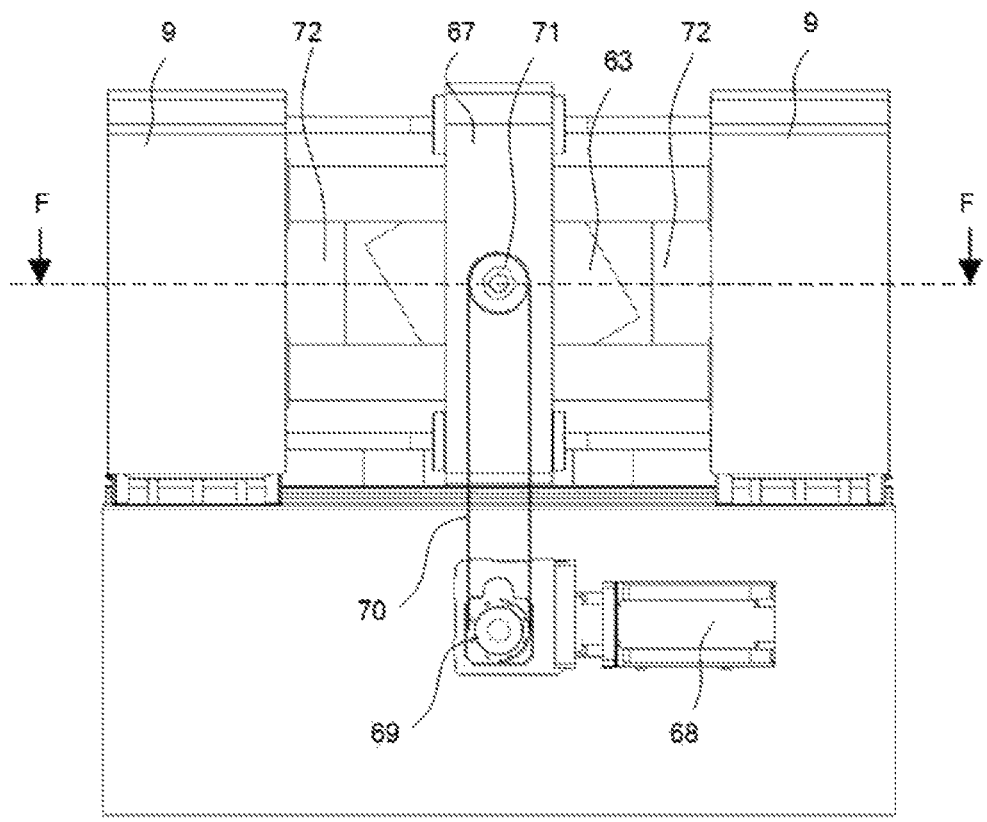
FIG. 15a shows a side view of a ninth embodiment of the present invention in an open mold position and with a rotating fixed mold rotated at a certain angle.
Figure 15B:
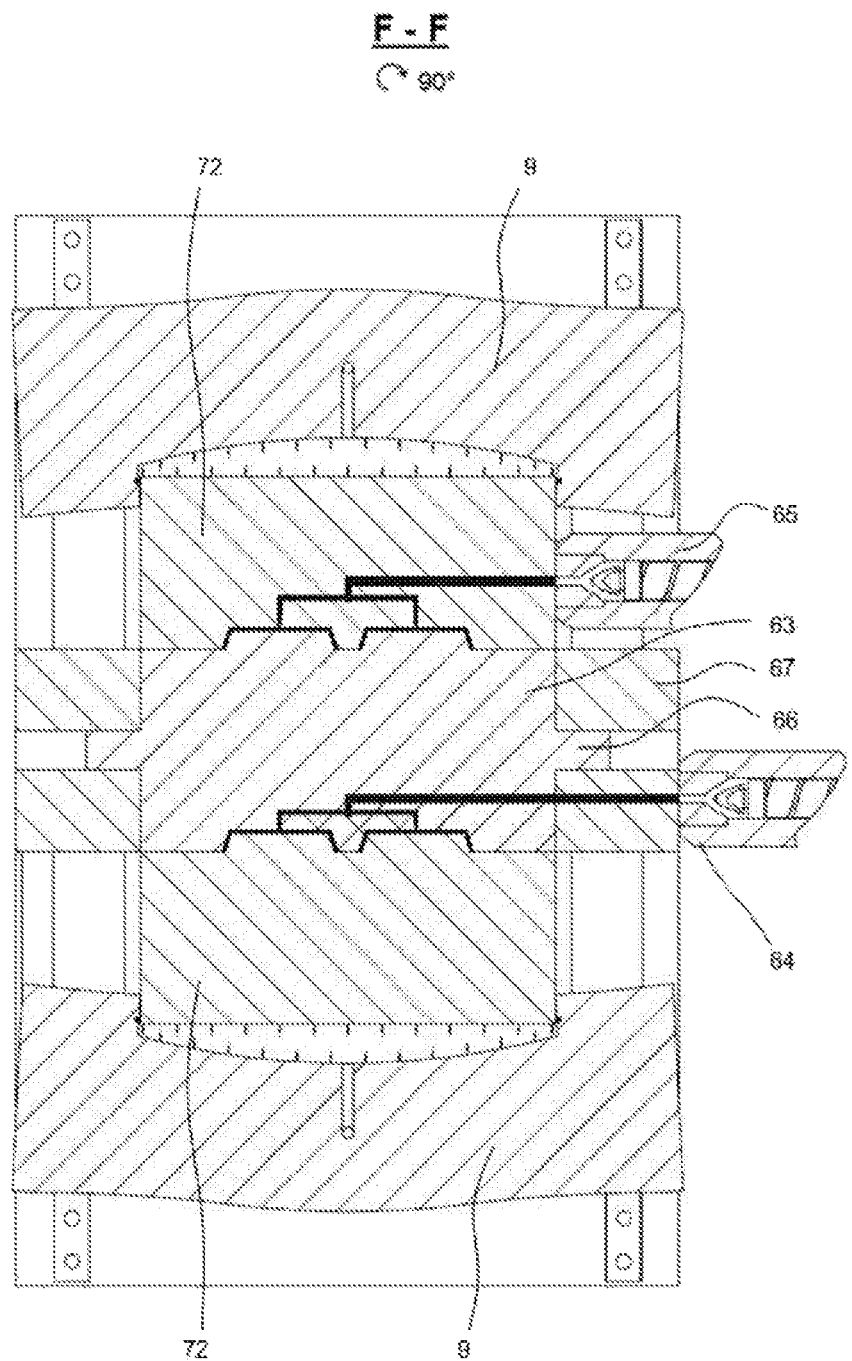
FIG. 15b shows a cross-sectional top view of a tenth embodiment of the present invention in a closed mold position.

FIGS. 15a and 15b show a ninth embodiment of the invention that envisages an advantageous possibility to use a rotating mold and two injection units for molding pieces with two different materials. In this case, the stationary central portion of the mold would be substituted by a rotating stationary central mold (63), which would have two or four molding faces, and wherein the rotation axis is horizontal, perpendicular to the movement axis of the mobile portions. One of the materials would be injected in one of the sides, while the second material would be injected in the other side. To do so, they must have two injection and plasticization units (64 and 65), one for each material, which must insert the material through the pressure plate (72) inserted in the mobile plate (9) or through the central frame (67). Due to this, the injection units must be removed when carrying out the opening of the mold, and must be coupled to the injection channel when it is closed. The translation system of the injection and plasticization units (91 and 92) for this case is not an object of this patent, and may be carried out in a conventional manner, with a hydraulic or electric actuator system, for example. In the case of carrying out the injection through the stationary central portion of the mold, the injection and plasticization units would not have to be removed at the time the opening of the mold is carried out, to do so there would be a rotating distributor placed inside the fixed central portion of the mold.

The stationary rotating mold (63) rotates on a shaft (66) located on a central frame (67). In order to carry out the rotation movement, there is, for example, a motor (68), a driving pulley (69), a belt (70) and a driven pulley (71) that is coupled to the shaft (66). At the time of the injection, one of the faces of the mold that closes with one of the mobile platens (4) is filled with the first type of material. At the same time, the other opposite face closes with the other mobile platen (4), it is filled with the second type of material, which had previously been filled with the first type of material. Once the injection is completed, the mold is rotated 90 degrees, such that the pieces filled with the second type of material can be demolded and fall towards the lower portion of the machine, while the molded pieces with the type-1 material remain in the mold in the upper portion. If it is a mold with two faces, a rotation of 180 degree would be completed and reinjection would be carried out. If it is a mold with four faces, the injection and demolding would take place at the same time. In this way, the production speed is increased by carrying out the two operations at the same time, with greater energy saving and space reduction.

The invention claimed is:

1. A plastic injection molding machine, comprising:
  a stationary central platen with at least two molding faces on at least two opposite sides of said central platen, and connected to an injection unit that provides molding material,
  two mobile platens, located on each side of the stationary central platen and movable on a same linear axis in order to face the molding faces;
  wherein each mobile platen comprises:
   a pressure plate facing the molding face,
   a mobile plate,
   at least one hydraulic chamber, responsible for pushing the pressure plate to carry out a uniformly distributed clamping force against the molding face of the stationary central platen, the chamber, being located between the mobile plate and the pressure plate, connected to a hydraulic system through at least one duct for the insertion and evacuation of a fluid in said chamber in controlled flow and/or pressure conditions, a locking system that prevents linear movement of the mobile plate when the clamping force is applied, and a movement system of said mobile platen.

2. The machine according to claim 1, wherein the movement system comprises at least two electric motors installed on the stationary central platen and at least two screws manufactured with an opposite turning hand at each end, each screw being coupled to each motor and to each mobile plate, such that upon integrally rotating the at least two screws cause simultaneous movement of both mobile platens.

3. The machine according to claim 1, wherein the locking system comprises fixed locking tie bars upon which the mobile platens move and to which they are locked.

4. The machine according to claim 3, wherein the locking system comprises locking bushings or nuts associated with the mobile platens and connected to the fixed tie bars, and a motor that activates the rotation of the bushings or nuts.

5. The machine according to claim 1, wherein the locking system comprises locking tie bars that cannot be moved axially, but can rotate about its own axis due to action of a motor in order to carry out the locking of the mobile platens.

6. The machine according to claim 1, wherein the movement system comprises toggle linkage that in turn serves as the locking system.

7. The machine according to claim 1, wherein the stationary central platen comprises more than two molding faces and a rotation movement according to an axis perpendicular with respect to the axis of the linear movement of the mobile platens.

8. A molding method for an injection machine according to claim 1, comprising the following steps:

movement of the mobile platens towards the stationary central platen and until the each pressure plate comes into contact with a respective one of the molding faces, locking of the mobile platens with the locking systems to prevent linear movement of the mobile plates, insertion of fluid in each hydraulic chamber, insertion of the molding material in the stationary central platen through the injection unit, evacuation of the fluid from each hydraulic chamber, unlocking of the mobile platens, and movement of the mobile platens, moving away from the stationary central platen.

\* \* \* \* \*